F. R. SMIDLEY.
CLOD CRUSHER.
APPLICATION FILED AUG. 18, 1915.
1,217,228. Patented Feb. 27, 1917.
FIG. I
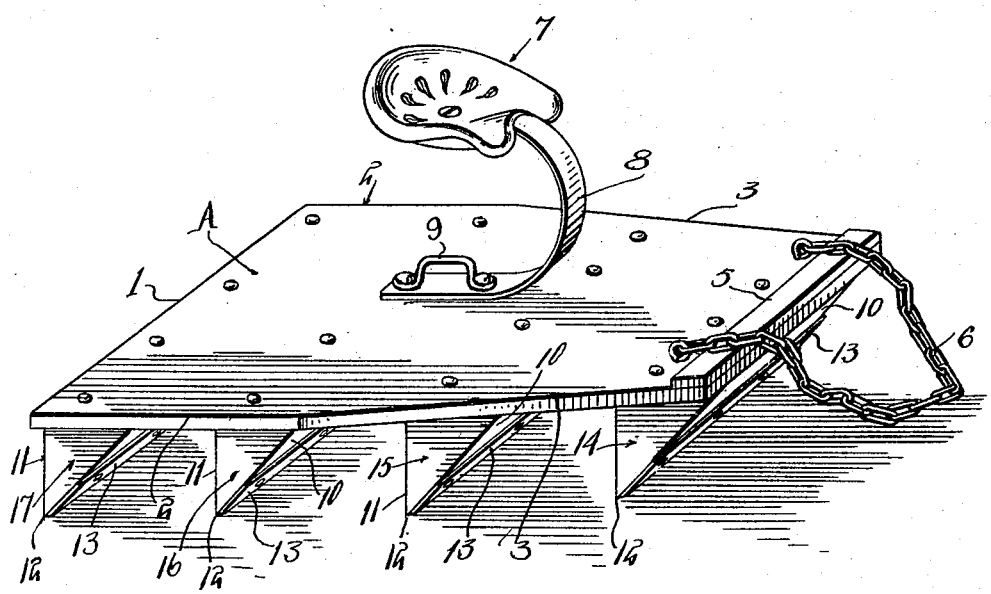
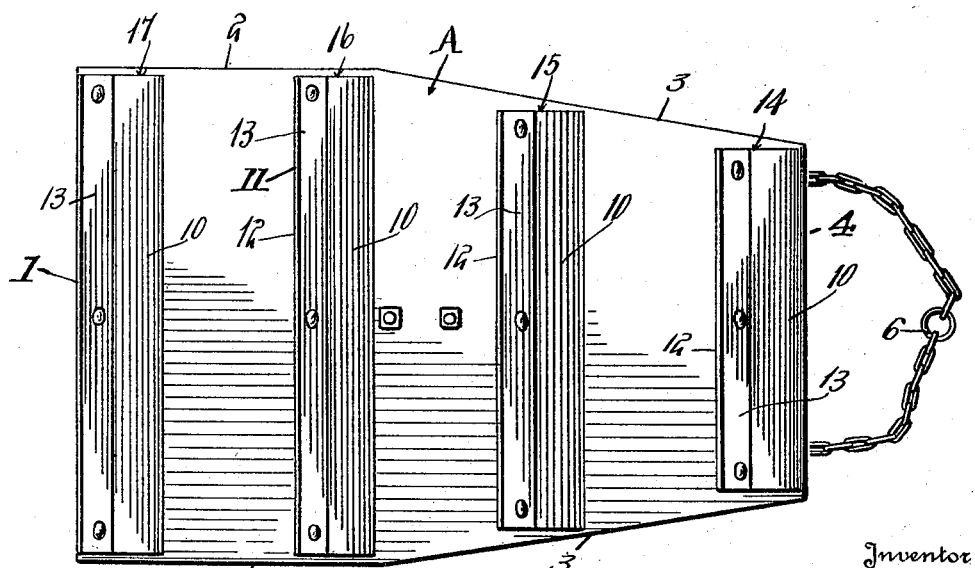
FIG. 2
Inventor
F. R. Smidley

UNITED STATES PATENT OFFICE.

FLOYD R. SMIDLEY, OF NEW HOLLAND, OHIO.

CLOD-CRUSHER.

1,217,228. Specification of Letters Patent. Patented Feb. 27, 1917.

Application filed August 18, 1915. Serial No. 46,119.

*To all whom it may concern:*

Be it known that I, FLOYD R. SMIDLEY, a citizen of the United States, residing at New Holland, in the county of Pickaway, State of Ohio, have invented certain new and useful Improvements in Clod-Crushers; and I do hereby declare the following to be a full, clear, and exact description of the invention, such as will enable others skilled in the art to which it appertains to make and use the same.

This invention relates to certain novel and useful improvements in a device for breaking clods of earth, and has particular application to a clod breaker and pulverizer, adapted especially for use in crushing the clods of earth at or between standing rows of corn.

In using a device of this character between standing rows of corn for the purpose of cultivation, and especially for pulverizing the clods or lumps of earth adjacent the rows of corn, it is necessary that the body of the pulverizer be so shaped and formed as to permit the draft animal pulling the same to step or walk on the ground very near to or at the base of the stalks or rows of corn, while at the same time the front corners of the platform or body of the machine must not strike against the stalks of corn, for this would cause the corn to be broken down. Furthermore, it is also desirable that the device should be so constructed at its rear portion as not to ride or lift from the earth and thereby permit clods or lumps to escape unbroken, especially adjacent the rows of corn stalks. It is, therefore, my purpose to provide a crusher and pulverizer adapted especially for use in the cultivation of corn, which will not strike at its front corners against the standing corn stalks, should the draft animal walk to one side of the center of the row, or in a path very close to the rows of the stalks, and secondly I aim to provide a device of this character wherein clods of earth will be thoroughly crushed, especially by the rear of the machine, thus avoiding the escape of the unbroken clods or lumps of earth at the rear of the machine, due to the lifting of the latter as above mentioned.

A further object of my invention is the provision of a device of this class which will embody the desired features of simplicity, efficiency, reliability and convenience, and which embodying as it does but relatively few parts, and these of the simplest construction, may be manufactured and marketed at a comparatively low cost.

With the above recited objects and others of a similar nature in view, my invention consists in the construction, combination and arrangement of parts set forth in and falling within the scope of the appended claim.

In the accompanying drawings:

Figure 1 is a perspective view of a clod pulverizer embodying my invention.

Fig. 2 is a bottom plan view thereof.

Before entering into a detailed description of my invention, I will state that essentially it comprises a platform or base board upon the top of which at its central portion, is mounted a suitable seat. To the underside of this base board I secure a series of spaced parallel scrapers or crushing bars, which are substantially triangular in cross section, each being provided with a relatively sharp ground engaging and clod crushing edge. I am aware of the fact that heretofore it has been proposed to provide a platform, to the underside of which are secured parallel spaced ground engaging and clod crushing bars, having acute earth pulverizing edges, but to these structures with which I am acquainted, certain disadvantages are incident. I have found that in instances where the platform is merely in the nature of a rectangular board, such structure cannot advantageously be employed for the cultivation of corn, because as it is drawn between the rows thereof, the draft animal, as is well known, has a tendency to walk to one side of the center of the row between the growing stalks of corn, that is to walk near to the roots of stalks. The result is that there is a tendency to pull the near front corner of the rectangular platform inward against the butt ends of the stalks, and as the animal continues its travel, this end corner of the platform will break or knock down the stalks. Furthermore, in such instances where it has been attempted to obviate such objection by making the platform substantially triangular with its widened end at the rear of the device, I have found that in such cases only one of the ground engaging bars or members is wide enough to crush the earth near the butts of the stalks, this being the rear member or bar of the device. And as the tendency of the machine is to lift up at the rear, the clods of earth immediately adjacent the rows of corn are liable to be missed or over-ridden by this rear crushing bar or member and thus remain unbroken. Of course, these clods of earth immediately adjacent the rows of corn will not be struck by the other crushing members of such a triangular arrangement because apart from the extreme rear crushing member, the crushing members of such triangular arrangement are not wide enough. Therefore, after my experience, I have devised the present structure to obviate the above-mentioned disadvantages, that is to say, permit of the crushing of all of the clods between the rows of corn without having the machine strike against the butt ends or bottom of the stalks and thus break the latter.

Referring now to the accompanying drawings in detail, the letter A indicates a base board or platform as an entirety. This platform is of a peculiar construction, embodying as it does a relatively wide straight, rear transverse edge 1, from which extend the parallel sections 2—2 of the side edges of the platform, these side edge sections extending in such parallelism to a point just to the rear of the central transverse line of the platform. From this point forward the side edges of the platform converge slightly, as shown at 3—3, and at their forward ends meet the transverse front edge 4 of the platform, this edge being, of course, of less width than the rear edge 1. The result is that this platform is in the nature of an elongated six-sided board. The forward edge of the platform is reinforced with the cross bar 5, while 6 indicates a suitable draft attachment, such as a chain or the like, attached to the front portion of the board. Mounted on top of the board at the central portion thereof is a suitable seat 7, having the usual flexible shank 8, while 9 is a handle for lifting and carrying the device. To the bottom of the board I attach a series of crushing bars or members, which I space apart and extend in parallelism transversely of the bottom of the platform or base-board. Each of these bars is substantially triangular in cross section with the inclined face 10 of each bar facing toward the front of the board, while the rear vertical face of each bar is shown at 11. The result is that each bar is provided with a relatively sharp or acute lower ground engaging edge 12, which may be provided or shod with a metallic wearing strip 13.

Now, in the present instance, I employ four of these crushing members or bars. The front bar 14 is the shortest of all, and lies beneath the cross bar 5. The second bar 15 is slightly longer than the bar 14, and lies just forward of the transverse central line of the platform, while the two rear bars 16 and 17 are of the same length, the bar 16 lying half way between the bar 15 and the rear bar 17. By making the two rear bars the same length, I not only place sufficient weight at the rear of the machine, but I insure that the bar 16 will, adjacent its end edges, strike the clods of earth adjacent the roots of corn, and crush the same, so that even though there should be a tendency for the rear of the machine, and consequently the rear bar 17 to lift, the clods of earth will not escape unbroken. It will furthermore be seen that by forming the forward portion of the platform with the inclined or converging side edges, which extend from a point a little to the rear of the central transverse line of the platform to the forward edge thereof, I insure that even when the draft animal walks practically upon the roots of the corn, the front corners of the platform will not strike against the upstanding corn and break down the same.

It will be further noted that the ground engaging bars do not extend completely from side to side of the platform or board, but the latter at its side edges overhangs these bars. The result is that the bars themselves will not strike against the standing corn to bend the latter, but the overhanging side edges contacting with the standing corn will push the latter slightly to one side or away from the device.

It will further be understood that my device when used in cultivating corn will cut down and kill any small weeds which might be growing between the rows of corn and which weeds, as well known, absorb the moisture of the ground about the corn and thereby deprive the latter of sustenance.

What I claim is:

A device of the class described comprising a flat base-board having a relatively wide transverse rear edge portion, parallel side edge portions extending forward from the rear edge portions to a point adjacent the central transverse line of the board, forwardly extending converging side edge portions extending from the parallel side edge portions, and a front transverse edge portion parallel to, but of less width than the rear edge portion, said parallel sided and converging sided portions lying in the same plane and being immovable with respect to each other, a series of spaced parallel transversely extending ground engaging bars fastened to the underside of the base-board, said bars being located one at the rear of the parallel sided portion of the base board, another at the front of the parallel sided portion, and a third at the front of the converging sided portion, the first two bars being of equal lengths, and a seat mounted on the central portion of the base-board, and a draft appliance connected with the forward portion of the base-board.

In testimony whereof, I affix my signature, in the presence of two witnesses.

FLOYD R. SMIDLEY.

Witnesses:
  RICHARD B. CAVANAGH,
  GEORGE W. SMIDLEY.

Copies of this patent may be obtained for five cents each, by addressing the "Commissioner of Patents, Washington, D. C."